W. H. JUAN.
LICENSE PLATE HOLDER.
APPLICATION FILED MAY 7, 1914.
1,122,279.
Patented Dec. 29, 1914.
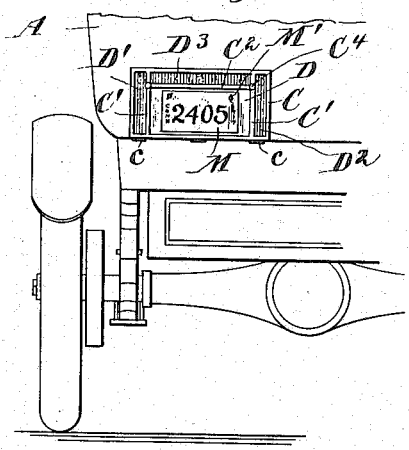
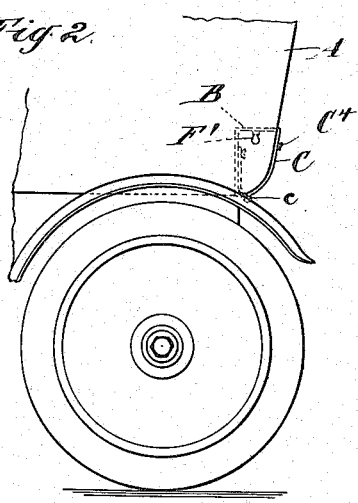
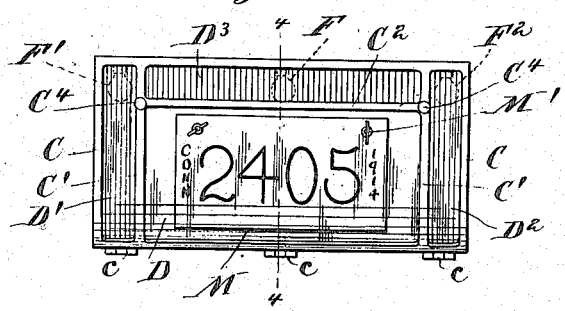
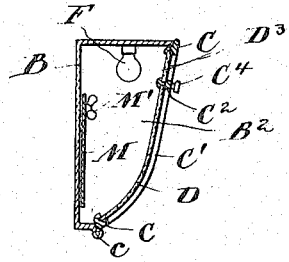
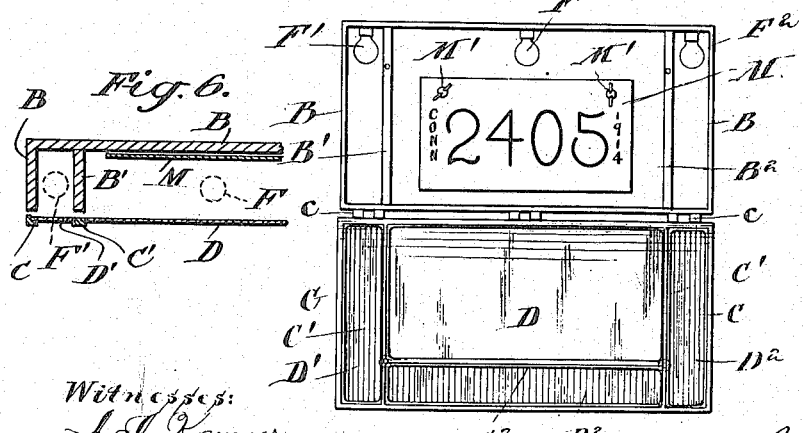
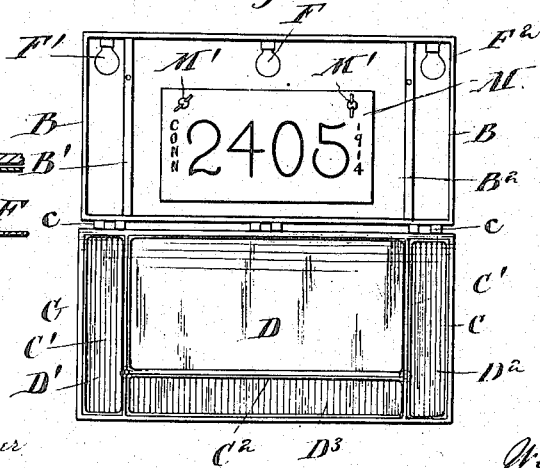
Witnesses:
Inventor:
Walter H. Juan,
by his attorney
Charles R. Searle.

UNITED STATES PATENT OFFICE.

WALTER H. JUAN, OF GREENWICH, CONNECTICUT.

LICENSE-PLATE HOLDER.

1,122,279.  Specification of Letters Patent.  Patented Dec. 29, 1914.

Application filed May 7, 1914. Serial No. 836,846.

*To all whom it may concern:*

Be it known that I, WALTER H. JUAN, a citizen of the United States, residing at Greenwich, in the county of Fairfield and State of Connecticut, have invented a certain new and useful Improvement in License-Plate Holders, of which the following is a specification.

The invention relates to means for holding and displaying license plates on automobiles and other vehicles, and the object of the invention is to provide neat and attractive means for mounting the license plate in position to be easily seen, protecting it against dust while traveling, and illuminating it efficiently at night.

The invention consists in certain novel features of construction and arrangement by which the above objects are attained, to be hereinafter described and claimed.

The accompanying drawings form a part of this specification and show an approved form of the invention.

Figure 1 is a rear elevation of a portion of an automobile equipped with the improved holder. Fig. 2 is a corresponding side view. The remaining figures are on a larger scale. Fig. 3 is an elevation of the plate holder in the closed condition. Fig. 4 is a vertical transverse section taken on the line 4—4 in Fig. 3. Fig. 5 is an elevation of the holder in the open condition. Fig. 6 is a cross section on the line 6—6 of Fig. 3.

Similar letters of reference indicate the same parts in all the figures.

A is the rear portion of the body of an automobile, shown as of the bell-back or outwardly curved tonneau type, having a recess provided in the rear face, preferably at one side of the center line, in which a receptacle or casing B is received and permanently held. The casing is of general rectangular form with the rear face shaped to match to and lie approximately flush with the adjacent surface of the body A, and such rear face is covered by a door hinged at $c$ to the lower edge of the casing and arranged to swing downwardly to permit access to the interior of the casing. The door comprises an outside frame C of metal having two vertical bars $C^1$ $C^1$ and a horizontal bar $C^2$ at the upper portion between the vertical bars. The spaces thus formed are filled with panels of glass, D $D^1$ $D^2$ and $D^3$, the panel D of clear or uncolored glass occupying a large portion of the door-area, with narrow vertical side panels $D^1$ $D^2$ and a narrow horizontal upper panel $D^3$, of red glass. The lower portions of the door and panels are shown as curved to match to the bell-shape of the tonneau. The interior of the casing is divided by vertical partitions $B^1$ $B^2$ into three chambers, the partitions matching to and concealed by the bars $C^1$ $C^1$ of the door when the latter is closed, and on the plane inner face of the main central chamber, preferably in the lower portion thereof, is mounted the license plate M held firmly in place by the winged screws $M^1$ extending through openings in the plate into the back wall of casing. The plate is so located relatively to the panel D as to be easily seen therethrough. Thumb-screws $C^4$ $C^4$ extending through the bars $C^1$ $C^1$ at their junction with the bar $C^2$, into the partitions $B^1$ $B^2$, hold the door securely closed.

Mounted on the interior of the upper wall of the casing are incandescent electric lamps F, $F^1$, $F^2$, the first, F, located centrally in the large middle chamber, and $F^1$ $F^2$ located each in one of the narrow side chambers, and each connected to a battery or other source of current and controlled by suitable switches, not shown, so that any may be caused to glow when desired. The lamps lie behind the red panels and are not visible when inactive.

By daylight the license plate M is plainly seen at all times through the plain panel D; at night the central lamp F is lighted continuously and illuminates the plate so that it may be seen distinctly, the direct rays from the lamp being softened by the red panel $D^3$, which serves as the tail light, while the plate is exposed to the full illuminating power of the lamp.

The lamps $F^1$ and $F^2$ in the side chambers throw no light upon the license plate and are intended to serve in indicating to a following car the intention to turn to the right or left; by lighting the lamp $F^2$ for a brief period and thus showing a red light at the right of the plate M an intention to turn to the right is indicated, and a corresponding lighting of the lamp $F^1$ indicates a turn to the left.

By inclosing the license plate within the casing it is protected from dust and consequently remains clean and legible for an indefinite period, and by locating the casing at a comparatively high point on the car the plate is very favorably presented for observation. The glass panels are sufficiently above the roadway to avoid soiling rapidly, and may be easily and quickly cleaned when obscured, by simply wiping the surfaces.

I claim:—

1. A casing adapted to be mounted on a vehicle, partitions in said casing dividing its interior into separated chambers, one of said chambers adapted to contain a license plate, means on the front face of the back wall of said chamber for holding a license plate, a door for said casing having an uncolored transparent panel covering the chamber containing such plate and through which the latter is visible, and having colored transparent panels covering the others of said chambers, and lamps in said chambers.

2. A casing adapted to be mounted in a recess in an automobile body, partitions in said casing dividing its interior into a central and side chambers, means on the front face of the back wall of said chamber for holding a license plate in such central chamber, a door on said casing having an uncolored transparent panel covering a portion of such central chamber, and having colored transparent panels covering the remaining portion of such central chamber and such side chambers, and a lamp in each of said chambers.

3. A casing adapted to be mounted on a vehicle, vertical partitions dividing said casing into a main and vertical narrow chambers, an electric lamp in each of said chambers, means for supporting a license plate within the main chamber, a door movably mounted on said casing and forming the front wall thereof and provided with horizontal and vertical bars forming a main opening and horizontal and vertical narrow openings, panels of colored glass in said narrow openings and a panel of uncolored glass in the main opening of said door, the vertical narrow openings of the door being disposed opposite the narrow vertical chambers of the casing when the door is closed.

In testimony that I claim the invention above set forth I affix my signature, in presence of two witnesses.

WALTER H. JUAN.

Witnesses:
  CHARLES R. SEARLE,
  HELEN V. RICE.